(12) United States Patent
Conner

(10) Patent No.: US 7,511,719 B2
(45) Date of Patent: Mar. 31, 2009

(54) METHOD, SYSTEM, AND COMPUTER PRODUCT FOR PERFORMING TRAPEZOIDAL REDUCTION OF POLYGONS AND INTERRUPTED POLYGONS

(75) Inventor: Kevin J. Conner, Kent, WA (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 09/917,392

(22) Filed: Jul. 27, 2001

(65) Prior Publication Data

US 2002/0036659 A1  Mar. 28, 2002

Related U.S. Application Data

(60) Provisional application No. 60/233,153, filed on Sep. 18, 2000.

(51) Int. Cl.
*G09G 5/00* (2006.01)
*G06F 3/048* (2006.01)
(52) U.S. Cl. .................. 345/620; 345/622; 715/764
(58) Field of Classification Search ............. 345/441, 345/622, 618–628, 629, 418, 634, 423; 715/764
See application file for complete search history.

(56) References Cited

U.S. PATENT DOCUMENTS

| 5,117,485 A | * | 5/1992 | Malachowsky et al. ...... 345/627 |
| 5,159,665 A | * | 10/1992 | Priem et al. ................. 345/627 |
| 5,555,358 A | * | 9/1996 | Blumer et al. ............... 345/441 |
| 7,215,345 B1 | * | 5/2007 | Hanko ......................... 345/620 |
| 2002/0070951 A1 | * | 6/2002 | Wilkinson et al. ........... 345/629 |

FOREIGN PATENT DOCUMENTS

| EP | 0 344 686 A | 12/1989 |
| EP | 0 521 210 A | 1/1993 |

* cited by examiner

*Primary Examiner*—Chante Harrison
(74) *Attorney, Agent, or Firm*—Ingrassia Fisher & Lorenz, P.C.

(57) ABSTRACT

A method, system, and computer program product for rendering an image to available display area based on parameters of one or more unusable display areas. The method includes determining one or more trapezoids for defining the available display area based on the parameters of the one or more unusable display areas. After an image is generated, the method determines if the generated image is within the determined one or more trapezoids, and renders the components of the generated image that are determined to be located within the one or more trapezoids.

4 Claims, 5 Drawing Sheets

US 7,511,719 B2

METHOD, SYSTEM, AND COMPUTER PRODUCT FOR PERFORMING TRAPEZOIDAL REDUCTION OF POLYGONS AND INTERRUPTED POLYGONS

PRIORITY CLAIM

This application claims priority from co-pending U.S. Provisional application Ser. No. 60/233,153 titled "Trapezoidal Reduction of Polygons and Interrupted Polygons" filed Sep. 18, 2000 the complete disclosure of which is incorporated herein by reference.

BACKGROUND OF THE INVENTION

Typically, an enhanced ground proximity warning system (EGPWS) must rapidly determine if EGPWS created objects are to be displayed on a display that may have overlaid polygons, thereby reducing the available area of the display. The easiest method for defining the available area is through the creation of a bitmap (i.e., white is inside/black is outside). However, the present method, which uses triangles to define the area, can not perform this in real-time while the aircraft is in flight. Therefore, a real-time drawing method is needed.

SUMMARY OF THE INVENTION

The present invention comprises a method, system, and computer program product for rendering an image to available display area based on parameters of one or more unusable display areas. The method includes determining one or more trapezoids for defining the available display area based on the parameters of the one or more unusable display areas. After an image is generated, the method renders the components of the generated image that are determined to be located within the one or more trapezoids.

In accordance with further aspects of the invention, determining the one or more trapezoids includes generating lines that define a boundary around the available display area. Once the boundary is defined, the method eliminates all lines being parallel to a predefined scan line direction and sets a first flag for each line to the lines maximum coordinate in a first axial direction. The first axial direction is orthogonal to the scan line direction. The method then sorts the remaining lines into a list according to a sorting scheme. Then, the method generates a trapezoid based on the first two lines in the list and the next highest flag value of all the flags, and replaces the flag of the first and second lines with the next highest flag. If the first flag for the first or second line is equal to the minimum coordinate of the respective line on the axis orthogonal to the scan line direction, the method eliminates that line. The method repeats until all lines are eliminated.

In accordance with other aspects of the invention, sorting includes setting a second flag for each line to a coordinate associated with the first flag in a second axial direction, the second axial direction being orthogonal to the first axial direction. The sorting scheme places lines with the highest first flag value first in the list and if lines have the same first flag value, places the line with the lower second flag value first in the list.

As will be readily appreciated from the foregoing summary, the invention provides a method, system, and computer program product for rendering an image to an available display area based on parameters of one or more unusable display areas.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a method, apparatus, and computer program product for rapidly defining available display area and displaying content within the defined available display area. Typically, a display process sends information to a display as long as the information is determined to be within a displayable area of the display. An example display is an enhanced ground proximity warning system (EGPWS) display that is present in many commercial and non-commercial aircraft. Many avionic display manufacturers now produce displays that include masked areas that are used for presenting various textual information. As a result, the remaining area is the only available area for displaying other information, such as EGPWS, radar, weather, or other types of avionic information. Other types of display manufacturers may also produce restricted area displays that, like the avionic displays, require some processing in order to determine if a generated image is to be rendered.

Figure 1:
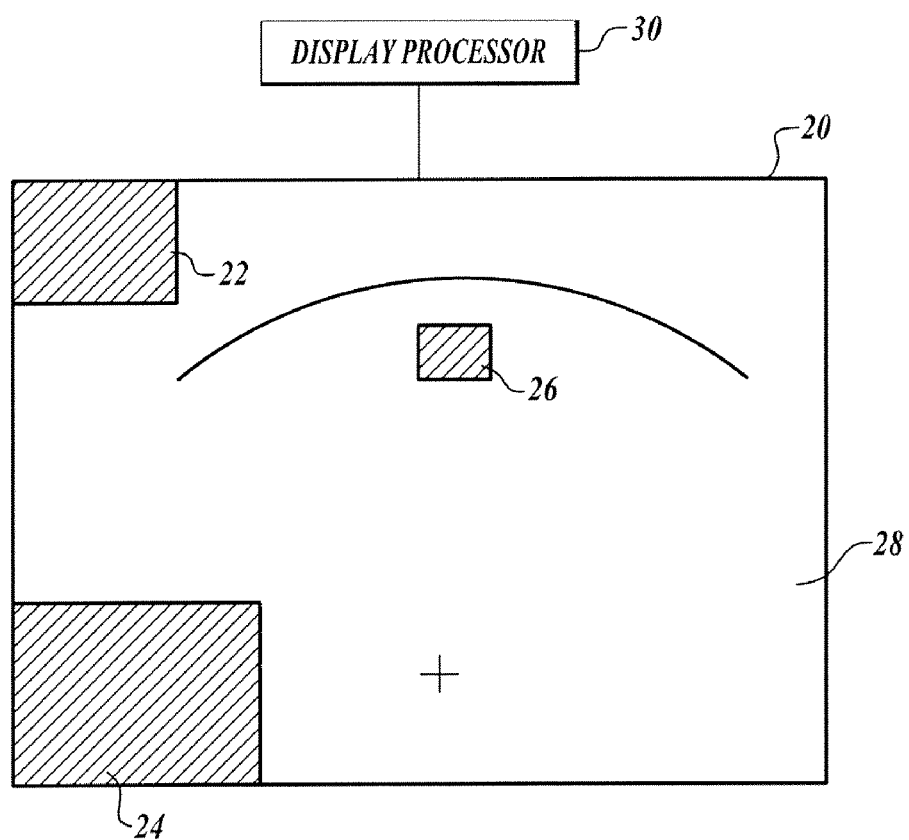
FIG. 1 is a front view of a display showing unusable and available display areas.
Figure 2:
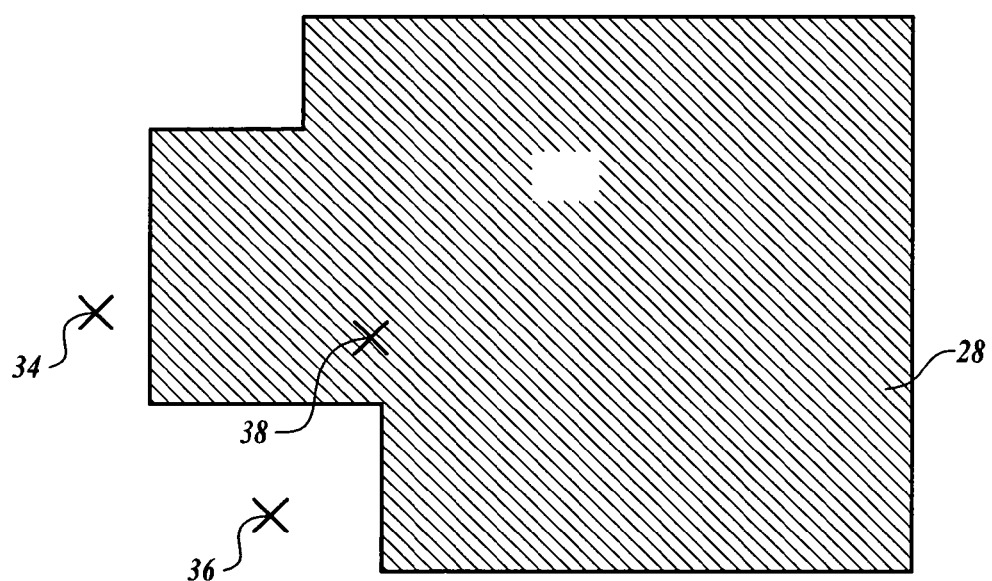
FIG. 2 is a front view of a display showing the available display area from FIG. 1.

FIG. 1 illustrates an example display 20 provided by a manufacturer. The display 20 includes information presentation areas (unusable areas) 22-26, which produces an available area 28. The manufacturer provides for the presentation of various information in these areas 22-26. The present invention provides a process for quickly and easily defining the available area 28 for effectively rendering other display information therein. Display users (e.g., a pilot) sometimes are provided with display mode options that allow the user to select which area 22-26 or combination of areas 22-26 to display. The method of the present invention performs real-time analysis of a newly selected display mode to define the available area 28. FIG. 2 further illustrates the available area 28 from FIG. 1. Once the available area 28 is defined, an application program renders an image into only the defined area 28.

Figure 3:
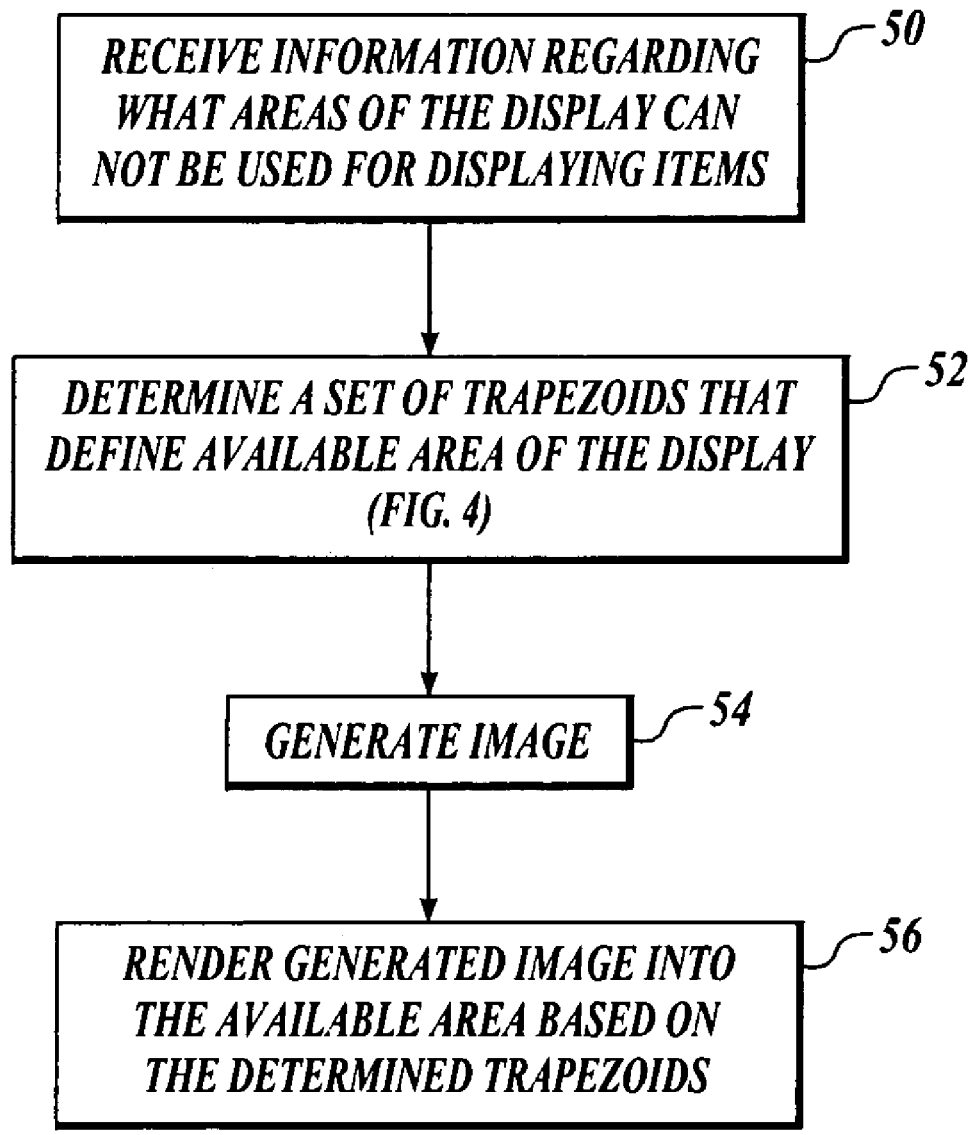
FIGS. 3 and 4 are flow diagrams illustrating the process of the present invention.

FIG. 3 illustrates a preferred process of the present invention. First, at block 50, the present invention receives information regarding the areas of the display previously designated and not for use by any other application sharing the display. Next, at block 52, the process determines a set of trapezoids that define the available area of the display. This step is described in more detail below in FIG. 4 and by example in FIG. 5. Then, at block 54, the application program that is designated to use the available area generates an image. Finally, at block 56, the process renders the generated image onto the display based on the determined set of trapezoids.

Figure 4:
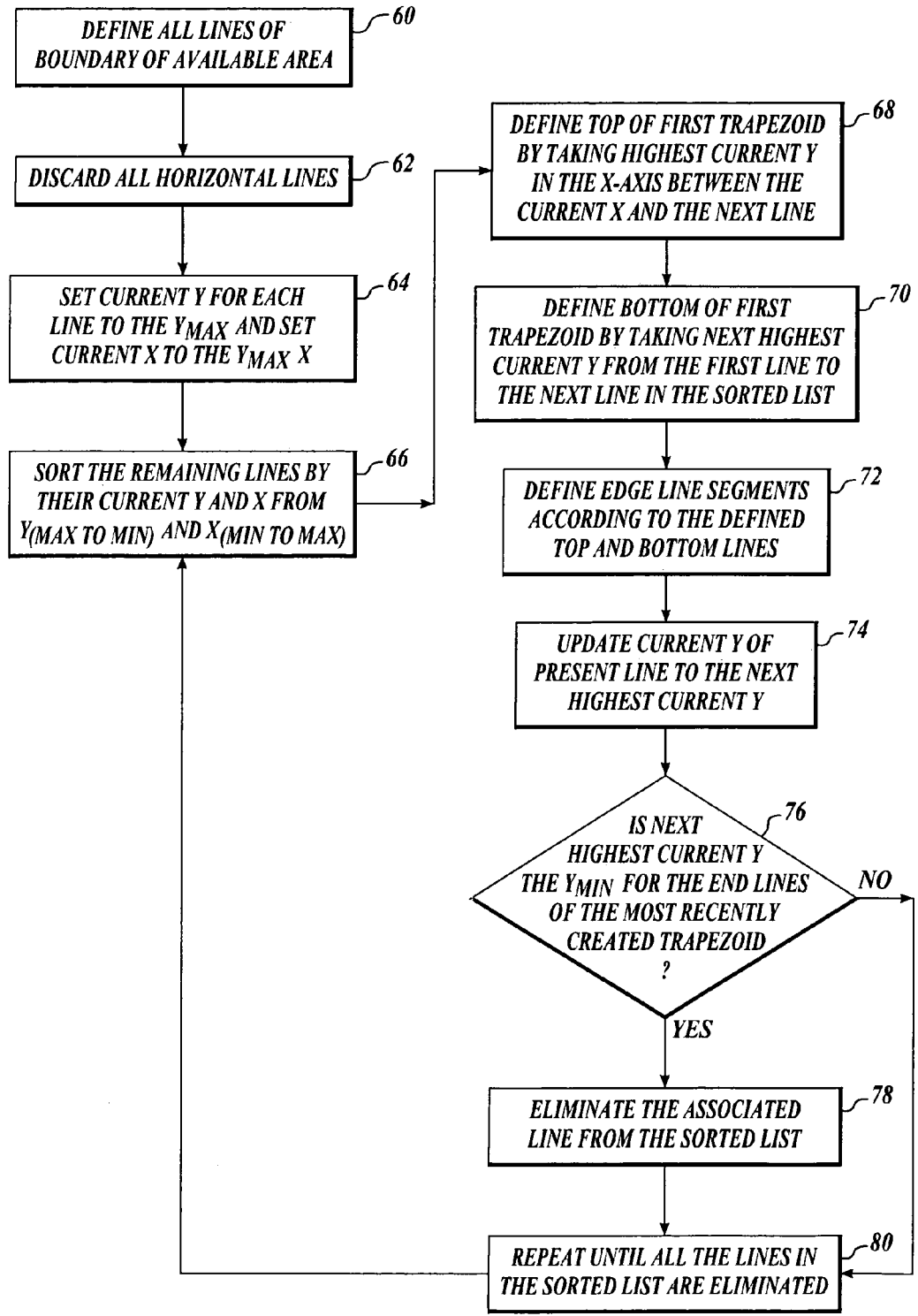

FIG. 4 shows an embodiment for determining a set of trapezoids, from block 52 of the process shown in FIG. 3, for a display that renders images with horizontal scan lines. First, at block 60, with respect to the available area after the pre-designated area information is considered, the process defines all lines that define the boundary of the available area. Then, at block 62, the process discards all horizontal lines. Next, at block 64, for the remaining lines, set current Y to the maximum value of Y (Ymax) for the respective line and set current X to the X value at Ymax. At block 66, the lines are sorted first from Ymax–Ymin (i.e., maximum to minimum of current Ys). If there are lines with identical current Ys, then they are sorted from Xmin–Xmax (i.e., minimum to maximum of current Xs).

Next, the process defines the trapezoids that describe the available area, see blocks 68-72. A first trapezoid is defined by making a horizontal line from the highest sorted current Y to the next line (i.e., from the top of the first sorted line to the top of the second sorted line). At block 70, the bottom of the first trapezoid is defined by using the Y of next highest current Y and making a horizontal line from the first line in the sorted list to the next intersecting line (may not be the second line in the sorted list). At block 72, the edge line segments of the first trapezoid are then found as those portions of the first and second line segments that connect the ends of the horizontal top and bottom lines. At block 74, the process updates the current Y of the first and second sorted line to the next highest current Y. Next, at decision block 76, the process checks whether the updated current Y is the same as the minimum Y value (Y min) for either the first or second line after the list is resorted. If the check at decision block 76 is not satisfied, then the process returns to block 66 and continues until all the lines have been eliminated. If the check at decision block 76 is true for the first and second line, then the line, where the updated and minimum Y are the same, is eliminated from the sorted list. At block 80, the process described above continues until all the lines are eliminated from the sorted list.

Figure 5:
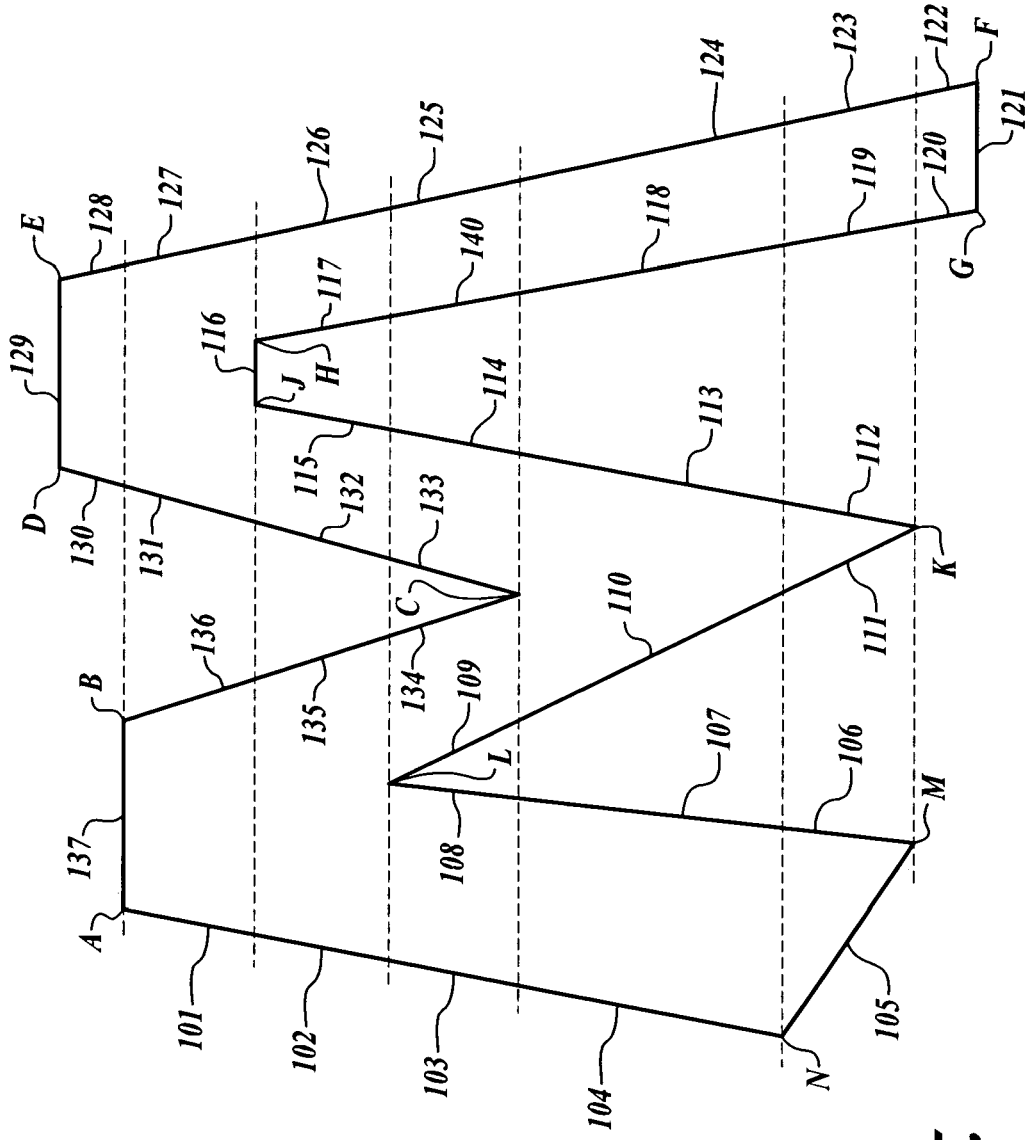
FIG. 5 is an example illustrating a complex display with useable and available areas.

FIG. 5 illustrates an example display where everything within the M-shaped object is available for use by an application. The M-shaped object is composed of points A, B, C, D, E, F, G, H, J, K, L, M, and N which form lines AB, BC, CD, DE, EF, FG, GH, HJ, JK, KL, LM, MN, and NA. The trapezoid defining process proceeds as follows:

1) The algorithm first discards all lines that are horizontal (or vertical if processing in the Y). This eliminates lines AB, DE, and FG.

2) The remaining lines are reset such that their current Y is set to the lines Max Y and the current X is set to the X for the Max Y.

3) The lines are sorted by current Y(max . . . min) and current X(min . . . max)

CD, EF, NA, BC, JK, GH, LM, KL, MN

4) Find next highest current Y.

5) The first pair forms a trapezoid with the base of the object set to the next highest current Y. This yields line segments 128 and 130.

6) The defined trapezoid is rendered.

7) The current Ys of CD and EF are updated to the next highest Y (i.e. the base of the trapezoid). If the new current Y is the Min Y for the line, the line is eliminated.

8) Repeat steps 3-7 until all lines are eliminated.

The progression is as follows:

Lines CD, EF, NA, BC, JK, GH, LM, KL, MN. Render trapezoid with line segments 128 and 130;

Lines NA, BC, CD, EF, JK, GH, LM, KL, MN. Render trapezoid with line segments 101 and 136;

Lines CD, EF, NA, BC, JK, GH, LM, KL, MN. Render trapezoid with line segments 127 and 131;

Lines NA, BC, CD, JK, GH, EF, LM, KL, MN. Render trapezoid with line segments 102 and 135;

Lines CD, JK, GH, EF, NA, LM, KL, BC, MN. Render trapezoid with line segments 132 and 115;

Lines GH, EF, NA, LM, KL, BC, CD, JK, MN. Render trapezoid with line segments 117 and 126;

Lines NA, LM, KL, BC, CD, JK, GH, EF, MN. Render trapezoid with line segments 103 and 108;

Lines KL, BC, CD, JK, GH, EF, NA, LM, MN. Render trapezoid with line segments 109 and 134;

Lines CD, JK, GH, EF, NA, LM, KL, MN. Render trapezoid with line segments 133 and 114;

Lines GH, EF, NA, LM, KL, JK, MN. Render trapezoid with line segments 140 and 125;

Lines NA, LM, KL, JK, GH, EF, MN. Render trapezoid with line segments 104 and 107;

Lines KL, JK, GH, EF, MN, LM. Render trapezoid with line segments 110 and 113;

Lines GH, EF, MN, LM, KL, JK. Render trapezoid with line segments 118 and 124;

Lines MN, LM, KL, JK, GH, EF. Render trapezoid with line segments 105 and 106;

Lines KL, JK, GH, EF. Render trapezoid with line segments 111 and 112; and Lines GH, EF. Render trapezoid with line segments 119, 120, 122 and 123.

Once all the trapezoids have been defined, a display processor (30, FIGURE 1) determines if pixels of an image to be displayed are within one of the trapezoids. The display processor scans all of the lines of the rendered trapezoids. The processor then sorts the lines, gathering those lines where the target Y value falls between the Ymax value and the Ymin value. The processor discards all others. For each pixel defined as (Xtarget, Ytarget), the processor compares the Xtarget value to the X value on a given line at Ytarget. The result is that the X value on that line is either greater than, less than or equal to Xtarget.

For each time the X value on the line equals the Xtarget value, the processor assigns a zero. Greater values receive a 1 value and lesser values a –1. As the processor cumulates a total across each scan line, values of 0 as a cumulative total across the line to a given point define the line as being inside of the desired trapezoid. All other values are outside. Coloring the points accordingly, the processor has accomplished the fill task.

The examples shown above are for use with a horizontal scanline display system. This process can also be used with a vertical scanline display system by changing Y for X and X for Y.

The following is an alternate embodiment for determining if an image element is within a reduced-size displayable area. First, all active lines or boundary lines are scanned. In a horizontal scanline display system, each display element is given a value depending upon the number of scanned lines that have been crossed in a scanline progression through the display elements of a target Y value. For example, referring to FIG. 2, if display element locations 34 and 38 have the same Y value, then all display locations along the scanline are given a –1 value until a boundary line is reached. After a first boundary line is crossed a 1 value is added to the display locations that follow the first boundary line, thereby assigning a 0 value for those locations. At the next boundary line encountered, a –1 value is added to the display locations that follow that next boundary line, thereby assigning a –1 value for those locations. The alternately adding a 1 and –1 value continues until the end of the scanline. After the above analysis, any image elements (smallest components of a generated image) are displayed only if the display element location has an assigned 0 value, otherwise the image element is not displayed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for rendering an image to one or more usable display areas of a clipped display window, the method comprising:
   determining one or more trapezoids, wherein the trapezoids define usable display areas of the clipped display window based on parameters of one or more unusable display areas;
   generating an image with a display processor;
   determining location of components of the generated image relative to the determined one or more trapezoids; and
   rendering the components of the generated image that are determined to be located within the one or more trapezoids,
   wherein determining the one or more trapezoids comprises:
   a) generating lines that define a boundary around all of the one or more usable display areas;
   b) eliminating all lines being parallel to a predefined scan line direction;
   c) setting a first flag for each line to the lines maximum coordinate in a first axial direction, the first axial direction being orthogonal to the scan line direction;
   d) sorting the remaining lines into a list according to a sorting scheme;
   e) generating a trapezoid based on the first two lines in the list and the next highest flag value of all the flags;
   f) replacing the flag of the first and second lines with the next highest flag;
   g) if the first flag for the first or second line is equal to the minimum coordinate of the respective line on the axis orthogonal to the scan line direction, eliminating that line; and
   h) repeating d-g until all lines are eliminated.

2. The method of claim 1, wherein sorting comprises:
   setting a second flag for each line to a coordinate associated with the first flag in a second axial direction, the second axial direction being orthogonal to the first axial direction;
   wherein the sorting scheme places lines with the highest first flag value first in the list and if lines have the same first flag value, place the line with the lower second flag value first in the list.

3. A system comprising:
   a display processor, and
   a display coupled to the display processor and configured to display an image rendered by the display processor, the display including one or more usable display areas of a clipped display window,
   wherein the display processor is configured to determine one or more trapezoids, wherein the trapezoids define usable display areas of the clipped display window based on parameters of one or more unusable display areas;
   generate an image;
   determine location of components of the generated image relative to the determined one or more trapezoids; and
   render the components of the generated image that are determined to be located within the one or more trapezoids,
   wherein the processor is further configured to generate lines that define a boundary around all of the one or more usable display areas;
   eliminate all lines being parallel to a predefined scan line direction;
   set a first flag for each line to the lines maximum coordinate in a first axial direction, the first axial direction being orthogonal to the scan line direction;
   sort the remaining lines into a list according to a sorting scheme;
   generate a trapezoid based on the first two lines in the list and the next highest flag value of all the flags;
   replace the flag of the first and second lines with the next highest flag;
   wherein, if the first flag for the first or second line is equal to the minimum coordinate of the respective line on the axis orthogonal to the scan line direction, the processor is further configured to eliminate that line; and
   the processor further configured to repeat until all lines are eliminated.

4. The system of claim 3, wherein the processor is further configured to set a second flag for each line to a coordinate associated with the first flag in a second axial direction, the second axial direction being orthogonal to the first axial direction;
   wherein the sorting scheme places lines with the highest first flag value first in the list and if lines have the same first flag value, place the line with the lower second flag value first in the list.

* * * * *